April 6, 1954        V. A. GALLOWAY        2,674,384
VEHICLE LOADING EQUIPMENT
Filed Nov. 28, 1951        3 Sheets-Sheet 3
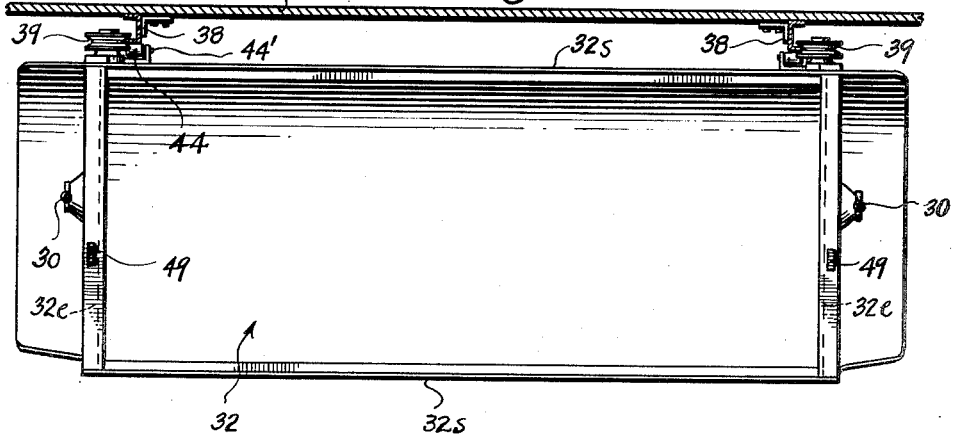
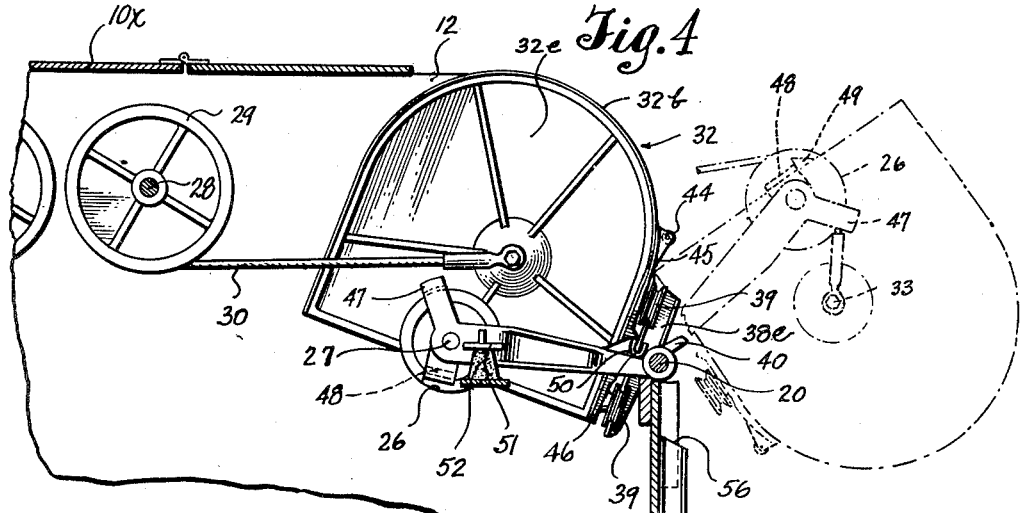
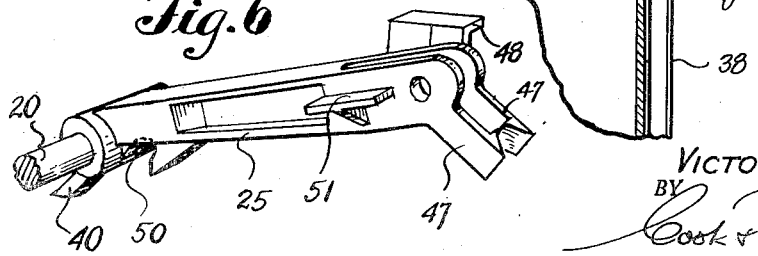
INVENTOR.
VICTOR A. GALLOWAY
BY
Cook & Robinson
ATTORNEYS

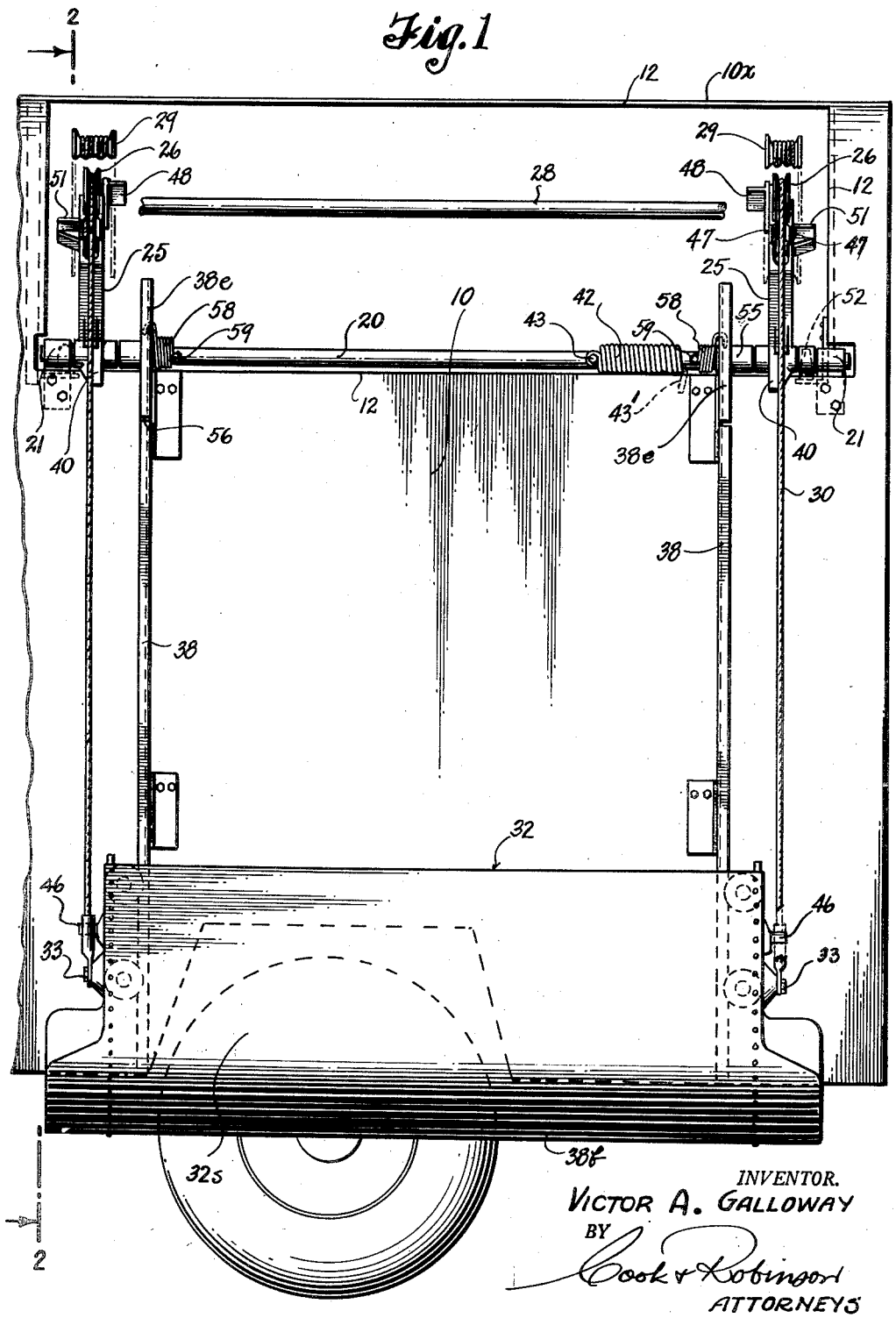

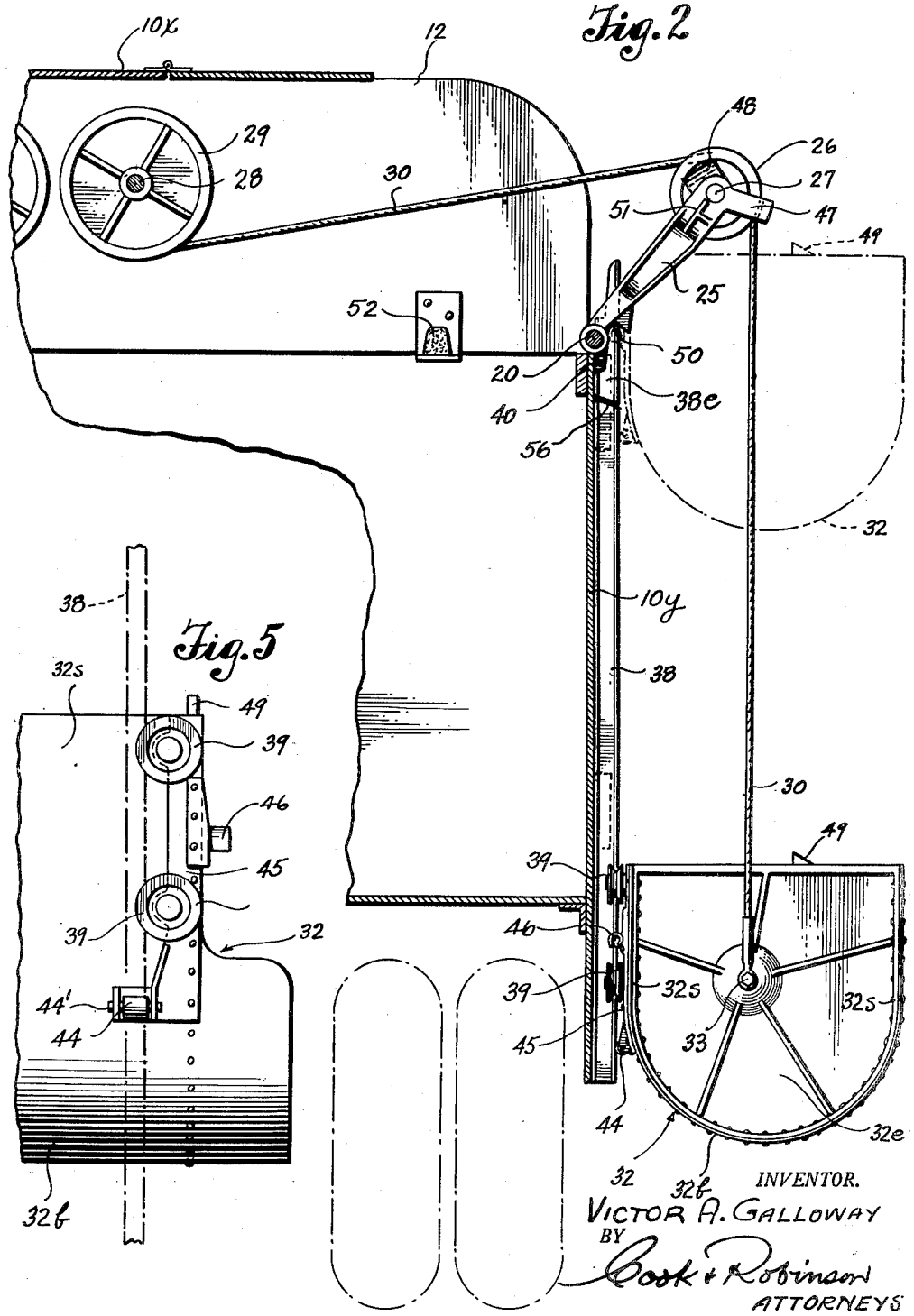

Patented Apr. 6, 1954

2,674,384

UNITED STATES PATENT OFFICE 2,674,384

VEHICLE LOADING EQUIPMENT

Victor A. Galloway, St. Claire Shores, Mich.

Application November 28, 1951, Serial No. 258,583

5 Claims. (Cl. 214—75)

This invention relates to improvements in loading and dumping equipment as applied to garbage and rubbish pick-up trucks. More particularly, the present invention has reference to improvements in the mechanism of garbage pick-up trucks of that kind described and illustrated in United States Patent #2,522,441, issued on September 12, 1950.

In the truck of the above mentioned patent, garbage pick-up buckets are adapted to be suspended by cables at the opposite sides of the truck body. The suspending cables are attached to and extend upwardly from the opposite ends of each bucket, passing over sheaves at the outer ends of dumping arms that extend outwardly and upwardly from the truck body near the top thereof, then leading inwardly and, at their inner ends, are attached to drums of a cable winding mechanism, whereby the buckets can be lifted and caused to be dumped, then lowered back to loading position.

The mechanism as disclosed in the patent provides that when a bucket has been lifted, by the winding in of the cables, from a lowered, loading position up to and against the outwardly and upwardly directed dumping arms, the bucket temporarily locks with the arms and then the arms are caused, by a continued inward winding of the cables, to swing upwardly and inwardly in a manner that results in the inverting of the bucket and the dumping of its contents into the truck body. The patent further discloses, as a feature of this arrangement of parts, that each bucket is equipped on its inboard wall with guiding and stabilizing rollers which, with the lifting and lowering of the bucket, are adapted to follow in rollering contact with guide rails that are fixed vertically to the adjacent side wall of the truck body. However, when the bucket reaches the dumping position, the rollers leave the guide rails, by reason of their termination, so that the bucket will have freedom of movement for dumping. It is anticipated in the patent that the rollers shall again engage in guiding contact with the rails when the bucket is returned by the arms to upright position preparatory to being lowered for loading.

In the actual operation of trucks constructed according to the disclosures of the above numbered patent, difficulty has been experienced, especially when the truck is operating on sloping or uneven surfaces, in getting the bucket guide rollers back onto the guide rails when the bucket is returned from inverted to upright position; this being due to a certain freedom of movement that is permitted by the suspending cables.

In view of the above mentioned difficulty, and for various other reasons, it has been the primary object of the present invention to provide improvements of construction based upon the design and use of guide rails from which the bucket guide rollers are not required to be disengaged for or during the bucket dumping operation and therefore the difficulty of re-engaging the rollers with the rails when the bucket is to be lowered, is avoided.

More specifically stated, the present invention resides in the provision of a new and novel form of guide rail for the bucket guide rollers; the guide rail being characterized by the inclusion therewith and as a part thereof, of a pivotally hinged upper end section with which the bucket guide rollers move into holding engagement with the lifting of the bucket up to dumping position and with which they remain engaged while the bucket is dumped, and which upper end section swings with the bucket as it is dumped, and is actuated back into exact registering alignment with the fixed lower end portion of the rail when the bucket is returned from inverted position to position for lowering, and permits the free travel of the guide rollers thereonto.

It is a further object of the invention to provide certain improvements of construction in the dumping brackets as provided at the ends of the buckets, and in the design of the dumping arms which mount the sheaves over which the bucket suspending cables operate, and which co-act with the brackets for the bucket dumping operations under influence of the suspending cables.

Still further objects of the invention reside in the details of construction and combination of parts, and in the mode of operation of the device as will hereafter be fully described.

In accomplishing these and other objects of the invention, I have provided the improved details of construction, the preferred forms of which are illustrated in the accompanying drawings, wherein—

Fig. 1 is a side view of a portion of a garbage collection truck body as equipped with a bucket, and bucket lifting and dumping mechanism embodying the improvements of the present invention therein.

Fig. 2 is a vertical cross-section of a part of the truck body taken on line 2—2 in Fig. 1, showing the bucket in a normal loading position and, indicating in dotted lines, its position when lifted up to dumping position.

Fig. 3 is a plan, or top view of the bucket, showing the guide rollers and rails.

Fig. 4 is a cross-sectional view of a part of the truck body showing the bucket opening, and the bucket in dumped position and, in dotted lines, showing a position of the bucket during the initial dumping movement.

Fig. 5 is a back view of one end portion of a bucket, showing the guide rollers as mounted on its inboard wall and in contact with a vertical guide rail.

Fig. 6 is a perspective view of one of the bucket dumping arms.

Referring more in details to the drawings—

In Fig. 1, 10 designates, in side elevation, a portion of the body of a truck that is suitable for the collection and loading of garbage, or refuse, by use of buckets equipped with hoisting cables operable in accordance with the teaching of the previously mentioned United States patent, #2,522,441.

To adapt the box-like body for use therewith of such buckets and mechanisms, it is equipped, for each bucket, with a receiving opening 12 located at the top and adjacent a side wall of the body. Truck bodies for this particular purpose may employ one or more buckets at each side, however, in the present instance, only one bucket and a portion of the body has been shown. Also, it is to be observed more particularly by reference in Fig. 2, that the opening 12 is contained partly in the top wall 10x and partly in the side wall 10y; the longitudinal edges of the opening being horizontal and parallel.

Mounted slightly above and extending along the lower edge of the receiving opening 12 and substantially in the plane of the side wall of the body, is a horizontal shaft 20. This is revolubly supported at its opposite ends in bearings 21—21 that are fixed to the frame structure of the side wall 10y as shown in Fig. 1. Fixed to this shaft, adjacent the bearings 21—21, are paired, bucket dumping arms 25—25, of like kind and size, and extended from the shaft in the same plane. At their outer ends, these arms are bifurcated and mount sheave wheels 26 therein on pivot pins 27. The sheave wheel axes are parallel to and equally spaced from shaft 20, and the arms are adapted to be swung in unison by the turning of the shaft.

Associated with the truck body is a cable winding mechanism, herein indicated only as a shaft 28, that is parallel with shaft 20, and on which shaft cable winding drums 29 are fixed in spaced relationship. This shaft is mounted in the body, inboard of the side wall opening. Cables 30 are fixed to and wound about the drums, to extend outwardly therefrom, passing through the opening 12, over the sheaves 26 of the bucket dumping arms 25—25, and thence downwardly and at their lower ends are connected, respectively, to opposite end walls of a loading bucket, designated in its entirety by reference numeral 32.

The bucket 32 is of trough-like form, with semi-cylindrically curved bottom 32b, vertical opposite side walls 32s and vertical end walls 32e. Extending from the opposite end walls of the bucket, from points slightly inwardly offset from the centers of the ends, are pivot studs 33 to which the ends of the cables 30—30 are attached. As thus suspended by the cables, the bucket 32 is adapted to be raised and lowered along the side wall of the truck between the lowered loading position and the raised dumping positions of Fig. 2, by paying out or winding in of the cables on the drums.

To guide and stabilize the bucket in its vertical travel between loading and dumping positions, two guide rails 38 are attached in vertical, parallel relationship to the outside of the side wall of the body. Mounted on the inboard wall of the bucket, and near each of its opposite ends, are two vertically spaced guide rollers 39—39, adapted to engage with and follow along the corresponding guide rails 38, in a manner to prevent endwise play or outward swing of the bucket from the truck body. Preferably the guide rails are of channel form in cross-section and each is disposed with one longitudinal flange spaced outwardly from the truck body side wall, and the two channels faced away from each other as seen in Fig. 3. The guide rollers 39 are formed with deep, circumferentially extending grooves adapted to receive and follow these flanges.

To provide that the contents of a loaded bucket may be automatically dumped into the truck body through the opening 12 when the bucket has been lifted to a fully raised position, I have provided that during the operation of loading the bucket, the lower arms 25—25 will be held in positions inclined outwardly and upwardly from the shaft 20, as seen full lines in Fig. 2; being retained against swinging downward from this inclined position under weight of the bucket, by shoulders or stops 40 that are formed integrally with and at the lower ends of the arms to extend below the shaft 20 and engage against the side wall structure at the lower edge of the opening 12. The arms are urged to and yieldingly retained in this position of outward and upward inclination by means of one or more heavy coiled springs 42 that are applied about the shaft 20, each with one end fixed thereto, as at 43, and its opposite end fixed to the body structure, for example, as has been indicated at 43' in Fig. 2.

There is also provided at each end of the bucket, on the inboard wall thereof and below the paired guide rollers 39, a stabilizing and guide roller 44, mounted by a pivot stud 44', for rolling travel on the outer face of the corresponding guide rail. It is shown in Fig. 5 that the guide rollers 39—39 and roller 44 at each end of the bucket are mounted by a plate 45 that is secured vertically to the inside wall of the bucket. Also, it is to be observed, more particularly by reference to Figs. 2 and 5, that a pivot member 46 extends from each plate 45, outwardly beyond the plane of the adjacent end wall of the bucket, and at a level between the axes of the corresponding guide rollers 39—39, for a purpose that will presently be explained in connection with the bucket dumping operation.

It is shown in Fig. 1 that the bucket dumping arms 25—25 are so spaced on shaft 20 as to receive the bucket between them when it is lifted up to dumping position. Formed integrally with each of the dumping arms, 25, at its outer end, are downwardly directed and spaced legs 47—47 which guide the bucket suspending cables 30 back onto the sheaves when the bucket is returned from inverted dumping position back to upright position.

Also, each arm is formed at its outer end with an inwardly directed stop shoulder or flange 48 adapted to engage against a stop lug 49 on the top edge of the adjacent end wall of the bucket when the bucket is lifted up to the dumping position in which it is shown in dotted lines in Fig. 4.

Each of the dumping arms 25—25 is formed at its under side and near its inner end with a downwardly facing recess, or notch 50 and these notches are adapted, when the bucket is elevated by the cables 30—30 to dumping position, to receive the pivot members 46 at the opposite ends of the bucket therein. After the bucket has been so lifted by the cables as to seat the pivots 46 in the arm recesses 50, as in dotted lines in Fig. 2, the bucket will then swing upwardly about these pivots to engage the stop lugs 49 on the top edges of its end walls flatly against the shoulders 48 of the dumping arms, as on the dotted line showing in Fig. 4, to temporarily render the arms and bucket relatively rigid. Then, a continued winding in of the cables 30—30 causes the arms to swing upwardly and inwardly, to carry the bucket to an inverted, dumping position within the body opening 12 as shown in Fig. 4.

When the bucket reaches the position of Fig. 4, stop lugs 51 that are formed on the arms, and extend outwardly therefrom, engage against cushioning stops 52 fixed on supports in the body; these stops being shown in Figs. 2 and 4.

As a feature of this invention, each of the vertical guide rails 38—38 are of two part construction. That is, each comprises a lower main portion of substantial length, that is rigidly and permanently secured to the side wall of the truck below the receiving opening 12, and a short extension portion, continuing from the upper end of the main portion, from slightly below the lower edge of the wall opening 12 to some distance above the level of shaft 20. These extension portions for the two guide rails are designated by reference numeral 38e, and each has a tubular mounting bearing 55 fixed rigidly thereto, whereby it is pivotally hinged on the shaft 20 adjacent the dumping arms.

The extension portion 38e of each rail is in exact alignment with the main portion of the rails, and these parts are similarly beveled at their engaging ends, as seen at 56 in Fig. 2, for swinging from and to close contact. Short lengths of coiled springs 58 are applied about the shaft 20 and have ends pinned thereto as at 59, and their other ends holdingly engaged with the corresponding extension portions 38e to yieldingly urge the latter into alignment with the main portions.

With the bucket and associated parts so arranged, it will be readily understood that when the bucket is lifted along the guide rails 38 up to the extension portions 38e, the aligned guide rollers 39—39 at each end of the bucket will pass readily onto the flange of the corresponding extension portion, and will be engaged with the dumping arms at the position shown in Fig. 2, before the dumping action of the bucket begins. The rollers 39—39 retain their holding contact with the flanges of the extension portions of the guide rails while the bucket is being dumped, and until it is returned back to lowering position. With the return of the bucket to this position, the extension portions 38e are brought back, by the tension of the coiled springs 58, to exact alignment with the lower or main portions of the rails and the guide rollers can then pass therefrom directly onto the lower section without any interruption of travel. Thus, at no time is the bucket left free to swing inwardly, outwardly or endwise relative to the body regardless of the slope or unevenness of the surface on which the truck may be operating.

The present construction of dumping arms, brackets and guides insures easier and more satisfactory operation and makes possible the loading of the truck when standing on hillside or slope.

Having thus described my invention, what I claim as new therein and desire to secure by Letters Patent, is:

1. The combination with a vehicle body having a side wall with a receiving opening adjacent the top edge thereof, and a loading mechanism comprising a dumping arm mounted adjacent the lower edge of the receiving opening to swing about a horizontal pivot axis through a limited arc from outside to inside of the body through said receiving opening, a cable guiding means at the outer end of the arm, a cable extended over said cable guiding means, a loading bucket suspended by the cable, and a cable winding means within the body operable to lift the bucket up to and against the arm and to cause the arm and bucket to be swung through said opening for the inverting and dumping of the latter; of a bucket guide rail fixed vertically to the body and including an upper end section that extends above and below the lower edge of the side wall opening and is hinged to the side wall to rotate about an axial line that is intermediate its ends in alignment with the pivot axis of the said dumping arm, and guides on the bucket arranged to travel in holding and guiding contact with the said guide rail and to move from the main section thereof onto the upper end section with the disposition of the bucket against the dumping arm.

2. The combination with a load holding body having a side wall and a receiving opening at the top thereof, a loading mechanism comprising a horizontal hinge shaft mounted along the lower edge of the said opening, a pair of arms mounted in spaced relationship on said shaft for swinging through said opening from outside to inside of the body, cable guiding sheaves at the outer ends of the arms, a pair of cables extended from within the body and outwardly over and downwardly from said cable guiding means, a loading bucket suspended by the cables from the outer ends of said arms, and a cable winding means within the body to which the inner ends of the cables are attached and operable for lifting the bucket up to and into contact with the arms and, by continued inward drawing of the cables, to cause the bucket to be carried by said arms to an inverted position within the body opening; of a guide rail fixed vertically to the body and comprising a main section and an upper end section that is pivotally hinged mid-way of its ends on said horizontal shaft and which is adapted to swing thereon through said opening, and guide members on the bucket arranged to maintain holding and guiding contact with the rail, and to pass from the main section thereof onto the hinged upper end section with the moving of the bucket to dumping position.

3. The combination with a load holding body with a side wall and receiving opening at the top thereof, a loading mechanism comprising a horizontal hinge shaft mounted adjacent the lower edge of the said opening, a pair of arms mounted in spaced relationship on said shaft for swinging through said opening from outside to inside of the body, means for limiting the outward and downward swing of said arms, cable guiding means at the outer ends of said arms, a pair of cables extended from within the body outwardly through said opening and over said cable guiding means, a loading bucket suspended by the cables from the outer ends of said arms, a cable winding means within the opening to which the inner ends of the cables are attached, and operable for lifting the bucket up to and into holding contact with said arms and then by continued inward winding of the cables to cause the bucket to be carried by said arms to an inverted position within the body opening, a pair of guide rails fixed vertically to the body side wall, below the said opening and in horizontal spacing, each comprising a main section and a continuing upper end section that is rotatably mounted on said horizontal hinge shaft, to swing through said opening, guide rollers fixed to the bucket to travel in holding and stabilizing contact with said rails at all times, and adapted to pass from the said main sections thereof onto the upper end sections with the moving of the bucket to dumping position, and springs acting against said upper end sections and urging them toward alignment with their respective main sections.

4. Mechanism as recited in claim 3 wherein said horizontal hinge shaft is rotatably mounted, and said arms are fixed thereto and a spring is applied under tension to said shaft to urge the arms toward their outer limits, and wherein the springs that actuate the upper end sections of the guide rails toward alignment with the main sections are applied about the shaft and each has one end fixed to the shaft and its other end connected with the corresponding rail section.

5. In a vehicle comprising a load holding body with a receiving opening, a horizontal hinge shaft rotatably mounted on the body and extended along the lower edge of said opening, a pair of arms fixed to said shaft adjacent opposite ends of the opening from outside to inside the body, means on the arms engageable with the body to limit the outward swing of the arms, cable guiding sheaves at the outer ends of the arms, a pair of cables extended from within the body and outwardly over and downwardly from said cable guiding means, a loading bucket, means pivotally attaching the outer ends of the cables to the opposite ends of the bucket for its pivotal suspension between them, a cable winding means operable to wind in the cables to lift the bucket up to and against the arms, means on the arms and bucket to engage in fixed contact and whereby, continued winding of the cables causes the arms to swing the bucket to an inverted position, means on the arms and body to limit the inward swing of the arms, spring means acting against the shaft to rotate the arms to return the bucket to a position outside the body when winding tension on the cables is relieved, a pair of guide rails on the body, each having a main section and an independently movable upper end section that is hinged on said horizontal hinge shaft, and guide rollers on the bucket in holding and stabilizing contact with said rails and movable onto the upper end sections thereof when the bucket is lifted to dumping position.

References Cited in the file of this patent

UNITED STATES PATENTS

| Number | Name | Date |
|---|---|---|
| 1,449,716 | Woodin | Mar. 27, 1923 |
| 2,183,813 | Howard et al. | Dec. 19, 1939 |
| 2,522,441 | Galloway et al. | Sept. 12, 1950 |
| 2,526,071 | Estey | Oct. 17, 1950 |
| 2,592,324 | Oliver | Apr. 8, 1952 |

FOREIGN PATENTS

| Number | Country | Date |
|---|---|---|
| 567,833 | Germany | Jan. 10, 1933 |
| 104,036 | Australia | May 23, 1938 |